(12) United States Patent
Sakata

(10) Patent No.: US 12,136,300 B2
(45) Date of Patent: Nov. 5, 2024

(54) ON-VEHICLE SECURITY MEASURE DEVICE, ON-VEHICLE SECURITY MEASURE METHOD, AND SECURITY MEASURE SYSTEM

(71) Applicant: NEC Corporation, Tokyo (JP)

(72) Inventor: Masayuki Sakata, Tokyo (JP)

(73) Assignee: NEC CORPORATION, Tokyo (JP)

(*) Notice: Subject to any disclaimer, the term of this patent is extended or adjusted under 35 U.S.C. 154(b) by 480 days.

(21) Appl. No.: 17/436,228

(22) PCT Filed: Feb. 5, 2020

(86) PCT No.: PCT/JP2020/004265
§ 371 (c)(1),
(2) Date: Sep. 3, 2021

(87) PCT Pub. No.: WO2020/184001
PCT Pub. Date: Sep. 17, 2020

(65) Prior Publication Data
US 2022/0157090 A1 May 19, 2022

(30) Foreign Application Priority Data
Mar. 14, 2019 (JP) .................. 2019-047283

(51) Int. Cl.
*G07C 5/00* (2006.01)
*B60W 50/12* (2012.01)
*G07C 5/08* (2006.01)
(52) U.S. Cl.
CPC ............. *G07C 5/008* (2013.01); *B60W 50/12* (2013.01); *G07C 5/085* (2013.01)

(58) Field of Classification Search
None
See application file for complete search history.

(56) References Cited

U.S. PATENT DOCUMENTS

2015/0066239 A1 3/2015 Mabuchi
2016/0359893 A1 12/2016 Kishikawa et al.
(Continued)

FOREIGN PATENT DOCUMENTS

CN 106557082 A * 4/2017 ......... G05B 23/0213
JP 2013-131907 A 7/2013
(Continued)

OTHER PUBLICATIONS

International Search Report for PCT Application No. PCT/JP2020/004265, mailed on Apr. 7, 2020.
(Continued)

*Primary Examiner* — Peter D Nolan
*Assistant Examiner* — Demetra R Smith-Stewart

(57) ABSTRACT

The on-vehicle security device 10 includes log collection means 11 for collecting communication logs, log analysis means 12 for analyzing the collected communication logs, and control means 13 for having alerting means issue an alert when it is determined that an error occurrence frequency exceeds a predetermined threshold value, based on an analysis result of the communication logs by the log analysis means 12, and blocks a communication path where an error has occurred when a state where the error occurrence frequency exceeds the predetermined threshold value continues after having the alerting means issue the alert.

10 Claims, 9 Drawing Sheets

(56) References Cited

U.S. PATENT DOCUMENTS

2020/0064816 A1    2/2020  Yasu et al.
2020/0396238 A1   12/2020  Haga et al.
2021/0105292 A1*   4/2021  Hamada .................. H04L 9/004

FOREIGN PATENT DOCUMENTS

| JP | 2013-187555 A  | 9/2013  |
|----|----------------|---------|
| JP | 2018-142167 A  | 9/2018  |
| JP | 2018-190465 A  | 11/2018 |
| WO | 2016/088304 A1 | 6/2016  |

OTHER PUBLICATIONS

English translation of Written opinion for PCT Application No. PCT/JP2020/004265, mailed on Apr. 7, 2020.
"The Cyber Kill Chain", [online], Lockheed Martin Corp., [retrieved Feb. 22, 2017], Internet<URL: https://www.lockheedmartin.com/en-us/capabilities/cyber/cyber-kill-chain.html>, pp. 1-6.
Tagato Hiroki et al., "Automated Security Intelligence (ASI) with Auto Detection of Unknown Cyber-Attacks", NEC Technical Journal, vol. 69, Sep. 2016, pp. 47-50.

* cited by examiner

ON-VEHICLE SECURITY MEASURE DEVICE, ON-VEHICLE SECURITY MEASURE METHOD, AND SECURITY MEASURE SYSTEM

This application is a National Stage Entry of PCT/JP2020/004265 filed on Feb. 5, 2020, which claims priority from Japanese Patent Application 2019-047283 filed on Mar. 14, 2019, the contents of all of which are incorporated herein by reference, in their entirety.

TECHNICAL FIELD

The present invention relates to a security measure against a cyber-attack on vehicles.

BACKGROUND ART

A connected car is an automobile (vehicle) that uses IoT (Internet of Things) technology and functions as a terminal. The connected car obtains data about the status of its own vehicle and various data such as the surrounding road conditions from sensors. The connected cars are expected to generate new value through the accumulation and analysis of data. Specifically, systems that automatically make an emergency call in the event of an accident, and systems that track the location of a vehicle when the vehicle is stolen are being put to practical use.

The connected cars work together with other vehicles and cloud servers through a wireless communication network. Therefore, there exists a device the communicates with devices outside the car or with other vehicles among on-vehicle devices in a connected car. Accordingly, there is a possibility that the connected car may be subject to a cyber-attack.

Cyber-attack can be classified into several types. One of the types of cyber-attacks is a targeted attack. A cyber kill chain is known as a flow in which the attack procedures of an attacker conducting a targeted attack are modeled (refer to, for example, non-patent literature 1).

As shown in FIG. 10, the cyber kill chain comprises seven stages i.e., Reconnaissance, Weaponization, Delivery, Exploitation, Installation, Command and Control, and Actions on Objectives.

In general, technologies are known to detect a cyber-attack on and after the "attack" stage in the cyber-kill chain. However, a cyber-attack on a connected car can result in degradation or disruption of services in the vehicle. For example, it could result in illegal control of the vehicle.

Therefore, it is desirable that a cyber-attack is detected during the "reconnaissance" stage in the cyber-kill chain, for example.

Patent literature 1 discloses a technology for detecting a sign of a cyber-attack. In that technology, frames passing through the on-vehicle network in a vehicle are monitored, and if an abnormal frame is detected, it is determined that the vehicle may be under attack.

There is a self-learning system abnormality detection technology (ASI: Automated Security Intelligence) that quickly detects the fact that an attack has occurred and automatically isolates the area affected by the attack, even in the case of an unknown attack (refer to non-patent literature 2, for example). In ASI, operation log are collected, and a normal state (the state in which the operation of the system to be monitored is stable) in the system to be monitored is identified by the learning process is performed by AI (Artificial Intelligence) on the collected operation logs. After that, the status of the monitored system is monitored in real time, and if the status deviates from the normal state, it is determined that an abnormality has occurred.

CITATION LIST

Patent Literature

Patent Literature 1: Japanese Patent Laid-Open No. 2018-190465

Non-Patent Literature

Non-Patent Literature 1: "THE CYBER KILL CHAIN", [online], Lockheed Martin Corp., [retrieved Feb. 22, 2017], Internet <URL:https://www.lockheedmartin.com/en-us/capabilities/cyber/cyber-kill-chain.html>

Non-Patent Literature 2: TAGATO Hiroki, et al., "Automated Security Intelligence (ASI) with Auto Detection of Unknown Cyber-Attacks," NEC Technical Journal, Vol. 69, September 2016, pp. 47-50.

SUMMARY OF INVENTION

Technical Problem

However, when abnormal frames are flowing in the on-vehicle network, a cyber-attack from outside the vehicle may have already entered the "attack" stage. Therefore, when using the technology described in patent literature 1, measures may be delayed. In addition, the ASI described in non-patent literature 2 can effectively detect a cyber-attack, but some additional effort is required to detect the "reconnaissance" stage of a cyber-attack.

It is an object of the present invention to provide an on-vehicle security measure device, an on-vehicle security measure method, and a security measure system that increase the possibility of detecting a sign of a cyber-attack before the actual stage of the attack in a cyber-attack.

Solution to Problem

An on-vehicle security device according to the present invention includes log collection means for collecting communication logs, log analysis means for analyzing the collected communication logs, and control means for having alerting means issue an alert when it is determined that an error occurrence frequency exceeds a predetermined threshold value, based on an analysis result of the communication logs by the log analysis means, and blocks a communication path where an error has occurred when a state where the error occurrence frequency exceeds the predetermined threshold value continues after having the alerting means issue the alert.

An on-vehicle security measure method according to the present invention includes collecting communication logs, analyzing the collected communication logs, and having alerting means issue an alert when it is determined that an error occurrence frequency exceeds a predetermined threshold value, based on an analysis result of the communication logs, and blocking a communication path where an error has occurred when a state where the error occurrence frequency exceeds the predetermined threshold value continues after having the alerting means issue the alert.

An on-vehicle security system according to the present invention includes a cloud server and an on-vehicle system that can communicate with the cloud server through a communication network, wherein the on-vehicle system includes log collection means for collecting communication logs, log analysis means for analyzing the collected communication logs, and control means for having alerting means issue an alert when it is determined that an error occurrence frequency exceeds a predetermined threshold value, based on an analysis result of the communication logs by the log analysis means, and transmits data indicating that the error occurrence frequency has exceeded the predetermined threshold to the cloud server through the communication network when a state where the error occurrence frequency exceeds the predetermined threshold value continues after having the alerting means issue the alert, and wherein the cloud server includes instruction means for transmitting data indicating to block a communication path where an error has occurred to the on-vehicle system when the data indicating that the error occurrence frequency has exceeded the predetermined threshold is received.

Advantageous Effects of Invention

According to this invention, it is possible to increase the possibility of detecting a sign of a cyber-attack.

DESCRIPTION OF EMBODIMENTS

Example Embodiment 1

Figure 1:
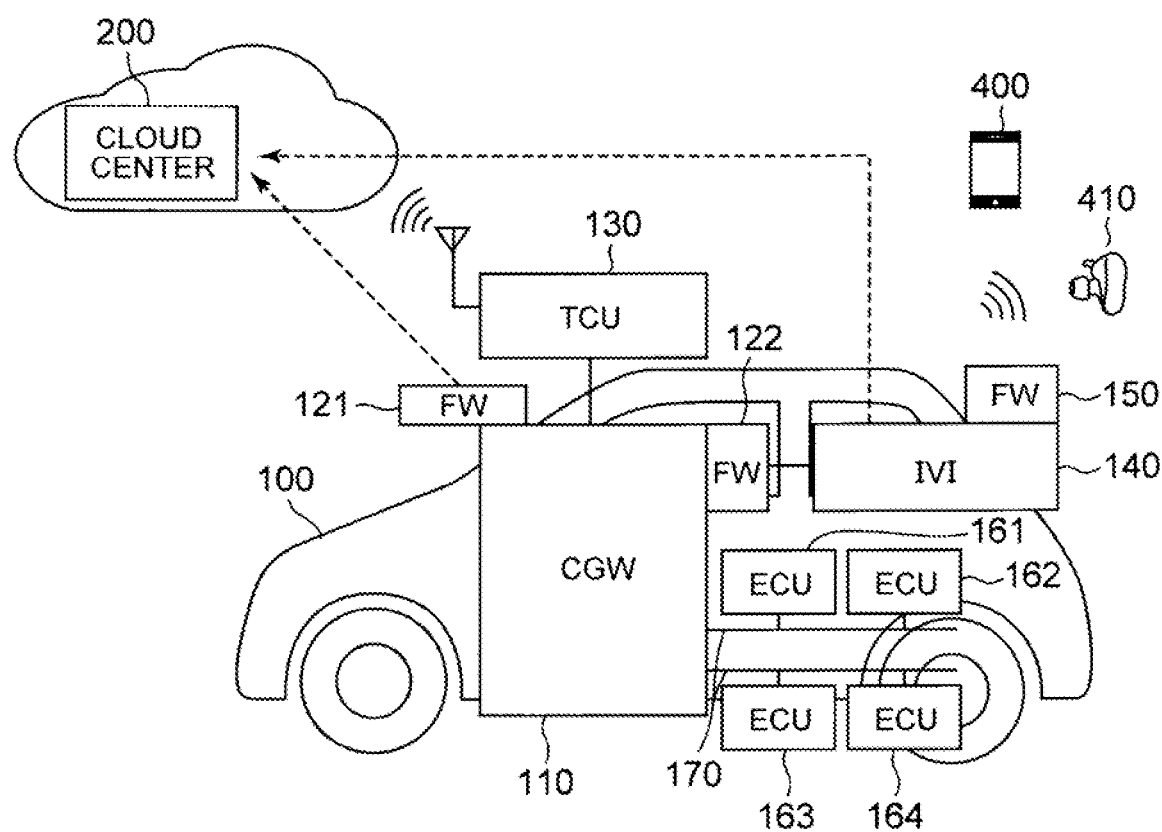
FIG. 1 It depicts a block diagram showing an example of an on-vehicle system including an on-vehicle network.

Hereinafter, the first example embodiment of the present invention is described with reference to the drawings. FIG. 1 is a block diagram of an example of an on-vehicle system including an on-vehicle network. In FIG. 1, devices outside the vehicle and other devices are also shown. In this example embodiment, the on-vehicle network refers to a portion of the data communication path that does not include nodes.

In the on-vehicle system shown in FIG. 1, CAN (Controller Area Network) is illustrated as the on-vehicle network. However, other types of on-vehicle networks may be used.

In the example shown in FIG. 1, the on-vehicle system installed in the vehicle 100 comprises a Central Gateway (CGW) 110, Firewalls (FWs) 121, 122, a telematics control unit (TCU) 130, an in-vehicle infotainment system (IVI System) 140, an FW 150, electronic control units (ECUs) 161, 162, 163, 164, and a CAN 170. The CGW is an example of a relay device that can connect different types of networks.

Although the FWs 121, 122 and the FW 150 are explicitly shown in FIG. 1, i.e., as independent hardware, the firewall function realized by the FWs 121, 122 may be incorporated into the CGW 110. The firewall function realized by the FW 150 may be incorporated into the IVI system 140.

The CGW 110 has a gateway function and is connected to multiple buses in CAN170. The FWs 121, 122 block illegal data such as illegal packets.

The TCU 130 has a function (wireless communication function) to perform wireless communication according to communication standards such as 3G (3rd Generation), LTE (Long Term Evolution), WiFi (registered trademark), etc., and is capable of bi-directional communication with Cloud Center 200. The CGW 110 can transmit and receive data to and from the cloud center 200 through FW 121 and TCU 130.

An IVI system 140 is a device that provides entertainment or necessary information to a user by audio and video. Therefore, an IVI system 140 includes at least a display and a speaker. One example of an IVI 140 is a device having a car navigation function. In the example shown in FIG. 1, a smartphone 400 and a BT (Bluetooth: registered trademark) earphone 410 that can wirelessly communicate with the IVI 140 are illustrated. In general, the smartphone 400 and the BT earphone 410 are used by a user who is inside the vehicle 100 or in the vicinity of the vehicle 100. The smartphone 400 and the BT earphone 410 are hereinafter referred to as external devices.

The IVI system 140 can transmit and receive data to and from the cloud center 200 through the FW 122, the CGW 110, the FW 121, and the TCU 130. The FW 150 blocks unauthorized data such as unauthorized packets. IVI system 140 can communicate with external devices through FW 150.

The cloud center 200 is, for example, a cloud server. A specific example is a center server in ITS (Intelligent Transport Systems).

For ease of explanation and so on, FIG. 1 shows the CGW 110 communicating with the cloud center 200 directly (not through the TCU 130) through the FW 121 (refer to the dashed arrow in FIG. 1), but in reality, the CGW 110 communicates with the cloud center 200 through the TCU 130. In addition, although the IVI system 140 is represented in FIG. 1 as communicating with the cloud center 200 directly (not through the TCU 130) (refer to the dashed arrow in FIG. 1), in reality, the IVI system 140 communicates with the cloud center 200 through the CGW 110 and the TCU 130.

Although four ECUs 161, 162, 163, 164 are illustrated in FIG. 1, in general, several tens or more ECUs are installed in a vehicle 100. Specific examples of ECUs are, for example, an engine ECU, a steering ECU, a suspension ECU, and a power supply ECU. In the this example embodiment, the power supply ECU is an example of power supply control means. The engine ECU is an example of engine control means. Although FIG. 1 illustrates that there are two buses in CAN, the number of buses is often three or more.

Figure 2:
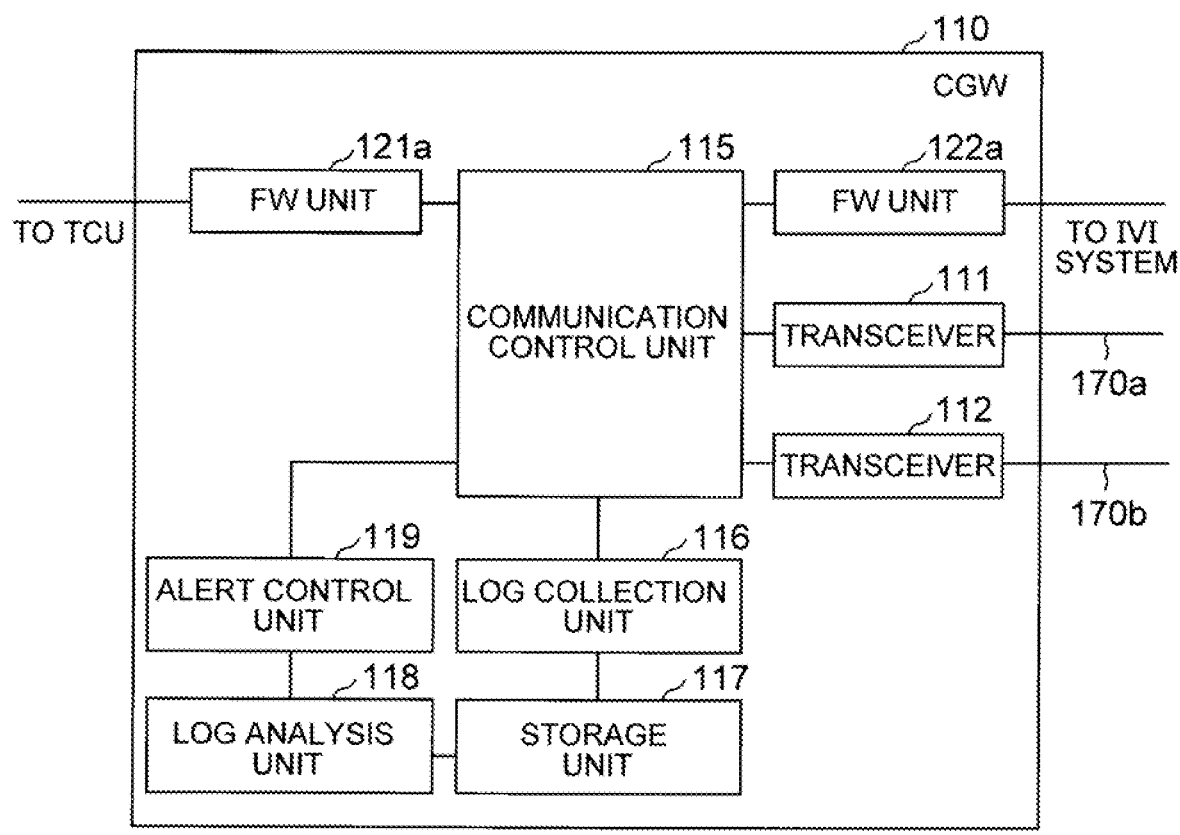
FIG. 2 It depicts a block diagram showing an example of a functional configuration of a CGW.

FIG. 2 is a block diagram showing an example of a functional configuration of the CGW 110. It should be noted that FIG. 2 shows a configuration in which the CGW 110 incorporates the functions of the FWs 121, 122. It is not necessary for the CGW 110 to incorporate the functions of the FWs 121, 122. The independent FWs 121, 122 may be installed outside the CGW 110, as shown in FIG. 1.

The CGW 110 shown in FIG. 2 includes transceivers 111, 112, FW units 121*a*, 122*a*, a communication control unit 115, a log collection unit 116, a storage unit 117, a log analysis unit 118, and an alert (warning) control unit 119.

The transceiver 111 is connected to one bus 170*a* of the CAN 170 and transmits data from the communication control unit 115 to the bus 170*a*. The transceiver 111 also receives data from the bus 170*a* and inputs it to the communication control unit 115. The transceiver 112 is connected to the other bus 170*b* of the CAN 170 and transmits data from the communication control unit 115 to the bus 170*b*. The transceiver 112 also receives data from the bus 170*b* and inputs it to the communication control unit 115.

The FW unit 121*a* has the same function as the FW unit 121 shown in FIG. 1. The FW unit 122*a* has the same function as the FW unit 122 shown in FIG. 1.

The communication control unit 115, for example, transfers data to the bus 170*a* or the bus 170*b* based on the data ID (Identification) received from the bus 170*a* or 170*b*. In addition, the communication control unit 115 transfers data received from the cloud center 200 to the IVI system 140 or transfers data received from the IVI system 140 to the cloud center 200. At this time, the communication control unit 115 performs protocol conversion, if necessary.

The log collection unit 116 collects logs (communication logs) related to data received through the TCU 130 and stores them as log data in the storage unit 117. The log analysis unit 118 analyzes the log data stored in the storage unit 117.

The alert control unit 119 executes the process for alert (warning) display when the log analysis unit 118 determines that the system may be under a cyber-attack (especially the "reconnaissance" stage of attack).

In this example embodiment, the on-vehicle security measure device that implements the on-vehicle security measure method is incorporated into the CGW 110. The on-vehicle security measure device is realized, for example, by the communication control unit 115, the log collection unit 116, the storage unit 117, the log analysis unit 118, and the alert control unit 119.

Figure 3:
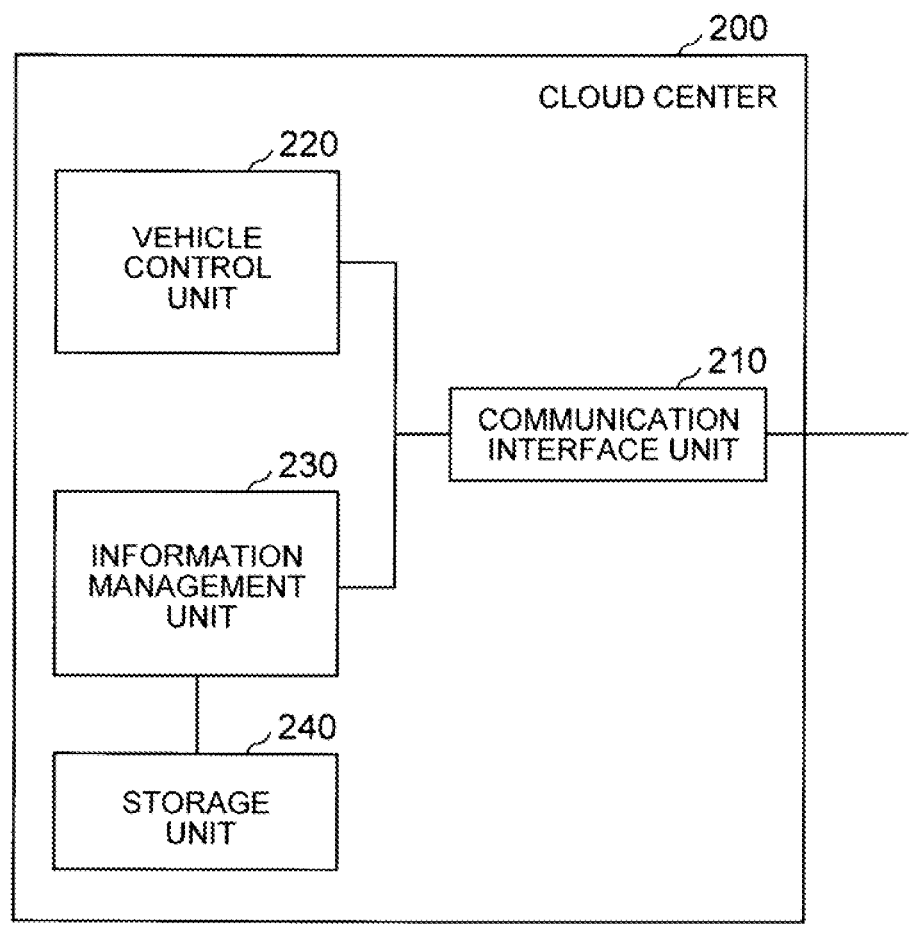
FIG. 3 It depicts a block diagram showing an example of a functional configuration of the cloud center.

FIG. 3 is a block diagram showing an example of a functional configuration of the cloud center 200.

In the example shown in FIG. 3, the cloud center 200 includes a communication interface unit 210, a vehicle control unit 220, an information management unit 230, and a storage unit 240.

The communication interface unit 210 has an interface function for communication with the vehicle 100. The information management unit 230 transmits traffic information data, etc. to the vehicle 100 through the communication interface unit 210. The traffic information data, etc. are stored in the storage unit 240.

The vehicle control unit 220 provides predetermined instructions to the vehicle 100 in response to requests from the vehicle 100.

Next, the operation of the CGW 110 will be described with reference to the flowchart of FIG. 4. In the process shown in FIG. 4, the data received from the side of TCU 130 is the object of processing.

Figure 4:
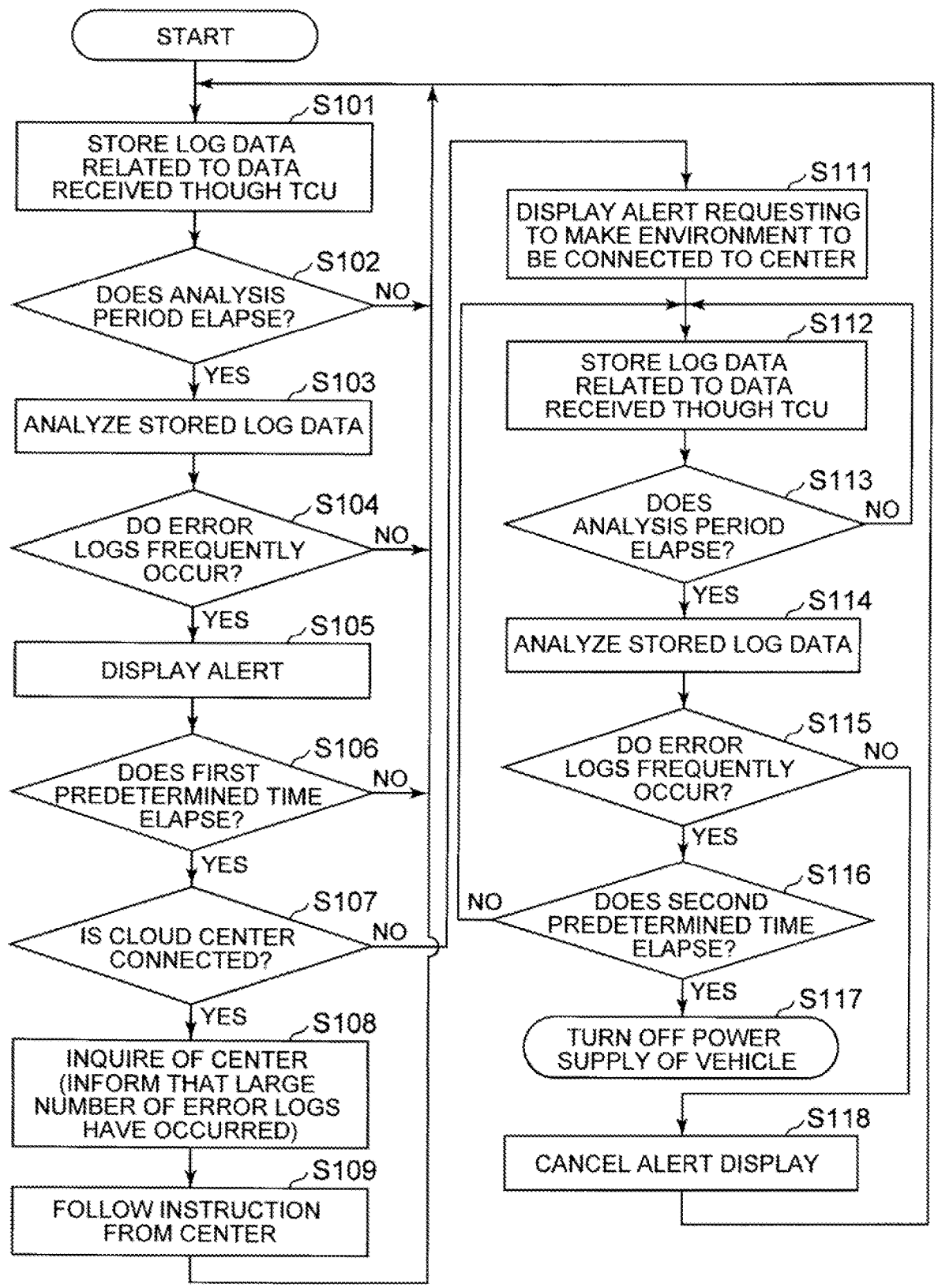
FIG. 4 It depicts a flowchart showing an operation of a CGW.

The process shown in FIG. 4 is based on the following concept. Specifically, in the "reconnaissance" stage, a brute force attack may be executed first to check the vulnerability of the device. When a brute force attack is executed, a large number of similar error logs will be accumulated in the device. As an example, when checking for free ports, the attacker checks 0x0000 to 0xffff in order. When it is known that the password is a four-digit number, the attacker will examine 0000 to 9999 in order. The device will keep a log corresponding to such investigation.

In the CGW 110, the log collection unit 116 sequentially stores the logs related to the received data in the storage unit 117 (step S101). When a predetermined period of time as an analysis cycle elapses (step S102), the log analysis unit 118 analyzes the log stored in the storage unit 117 (step S103). The analysis cycle is, as an example, several hours, a day, or several days. The log analysis unit 118 may execute the process of step S103 when the number of logs stored in the storage unit 117 reaches a predetermined number.

If the log analysis unit 118 determines that error logs frequently occurs as a result of analyzing the logs (step S104), the process of step S105 is executed. The log analysis unit 118 determines, for example, that error logs have occurred frequently when a predetermined number or more (a number exceeding a threshold value) of error logs are included in the logs collected in the analysis cycle. For example, the predetermined number is set to a value that is several hundred to several thousand times higher than the number of error logs observed in the normal state (a state in which no cyber-attack is expected). As a specific example, when the number of error logs observed in the normal state is 10,000 per day, the predetermined number is set to 100,000,000 per day. In this example embodiment, the high number of error logs is a specific example of the possibility of "reconnaissance" in a cyber-attack.

When it is determined that error logs have not occurred frequently in the process of step S104, the process is returned to step S101.

In this example embodiment, the log analysis unit 118 determines that error logs occur frequently when the logs collected in an analysis cycle contain a predetermined number of error logs or more, but the log analysis unit 118 may determine that error logs occur frequently when a ratio of the number of error logs to the total number of log data in an analysis cycle exceeds a predetermined threshold.

In step S105, the alert control unit 119 executes the process for an alert display (first alert display). Specifically, the alert control unit 119 requests the communication control unit 115 to display an alert (warning). The communication control unit 115, in response to a request, for example, transmits data for instructing an alert display to the IVI system 140 through the FW unit 122. When receiving the data, the IVI system 140 displays the alert display on the display. If there is display means (an example of alerting means) other than the IVI system 140 in the vehicle 100, the communication control unit 115 may transmit data for instructing the alert display to such display means. In addition, the alert control unit 119 may request the communication control unit 115 to output an alert sound instead of outputting a request for alert display. In that case, the alerting means is realized by a speaker, for example.

The alert control unit 119 checks whether or not the first predetermined time has elapsed since the process of step S101 was first executed (step S106). The first predetermined time is an arbitrary time longer than the analysis cycle, but for example, it is set to two to three times the analysis cycle. If the first predetermined time has not elapsed, the process is returned to step S101.

When the first predetermined time has elapsed, the alert control unit 119 confirms whether or not the CGW 110 is connected to the cloud center 200 (step S107). The state in which the CGW 110 is connected to the cloud center 200 is, for example, a state in which the CGW 110 can exchange data with the cloud center 200. Whether or not it is in a state in which data can be exchanged with the cloud center 200 can be easily understood by checking whether or not the communication control unit 115 can receive data that can identify that a source is the cloud center 200.

When the CGW 110 is not connected to the cloud center 200, the process is transferred to step S111.

When the CGW 110 is connected to the cloud center 200, the alert control unit 119 outputs data indicating that a large number of error logs have occurred to the communication control unit 115 (step S108). The communication control unit 115 outputs the data to the TCU 130 through the FW unit 121a. The TCU 130 transmits the data to the cloud center 200. The data indicating that the error logs have occurred frequently also serves as the data for making an inquiry to the cloud center 200.

When the vehicle control unit 220 in the cloud center 200 receives data indicating that a large number of error logs have occurred through the communication interface unit 210, the vehicle control unit 220 executes a predetermined process corresponding to the data. The predetermined processing includes, for example, processing to permanently turn off the power supply of the vehicle 100. The term "permanently turn off" means that after the power is turned off, it cannot be turned back on by the user. Since the power cannot be turned back on, it is not possible to restart the engine. When the power supply of the vehicle is turned off, the communication path where the error is occurring will be blocked, and the attacker will not be able to attack through other communication paths. The predetermined process may also be to keep the power on but not to restart the engine.

After the power is permanently turned off, the vehicle 100 is restored to a state in which the engine can be restarted or the power can be turned back on, for example, by an authorized person present at a car dealership or the like. In other words, the vehicle can not be restored to a state in which the engine can be restarted or the power can be turned on without human intervention. The authority described above includes, for example, the authority regarding the cryptographic key as the data for the restart command. In that example, specifically, the communication control unit 115 receives encrypted data from an authorized person, and the alert control unit 119 decrypts the received data with the encryption key (decryption key). When the data is correctly decrypted, the alert control unit 119 requests the engine control means to restore the engine to a state where it can be restarted. In that example, on-state of the power supply of the vehicle is maintained.

The vehicle control unit 220 transmits data indicating a predetermined process to the CGW 110 through the communication interface unit 210. The data is received by the CGW 110 through the TCU 130, and the CGW 110 executes the processing indicated by the data (step S109). As an example, when the data indicates a process for permanently turning off the power supply, the alert control unit 119 executes a process for permanently turning off the power supply of the vehicle 100. For example, the alert control unit 119 transmits an instruction for turning off the power supply to the ECU that controls the power supply, through the communication control unit 115 and the transceiver 111 or the transceiver 112. The ECU sets the vehicle 100 to a state where the power supply is not supplied to the vehicle 100. The ECU controls the state in which the power is not supplied to the vehicle 100 so that the state is permanently continued.

The vehicle control unit 220 may transmit, as data indicating a predetermined process, data indicating that the communication path currently established by the CGW 110 is to be disconnected (for example, data indicating that the session is to be disconnected). When such data is used, the communication control unit 115 can disconnect the communication path in which the error is occurring when receiving such data.

In any case, in the vehicle 100, the alert control unit 119 or the communication control unit 115 can block the communication with the cyber attacker by executing a predetermined process. In other words, the on-vehicle system in the vehicle 100 can generate a situation where the cyber-attack cannot continue.

In step S111, the alert control unit 119 executes a process for an alert display (second alert display). Specifically, the alert control unit 119 requests the communication control unit 115 to display an alert requesting that "the vehicle 100 be made an environment to be connected to the cloud center 200". In response to the request, the communication control unit 115 transmits, for example, data for instructing the alert display to the IVI system 140 through the FW unit 122a. Once the IVI system 140 receives the data, it displays the alert display on the display.

The alert display that requests "the vehicle 100 be made an environment to be connected to the cloud center 200" is an example of the second alert display. Other alert displays may be displayed as long as they are more severe than the first alert display.

The alert control unit 119 may request the communication control unit 115 to output an alert sound instead of outputting a request for an alert display. The alert sound should be a louder or higher frequency alert sound than the alert sound that is output in place of an alert display in the process of step S105.

Thereafter, the log collection unit 116 sequentially stores the logs related to the received data in the storage unit 117 (step S112). When the predetermined period as the analysis cycle elapses (step S113), the log analysis unit 118 analyzes the log stored in the storage unit 117 (step S114).

When the log analysis unit 118 determines that error logs do not frequently occur as a result of analyzing the logs (step S115), the process is transferred to step S118.

When the log analysis unit 118 determines that error logs frequently occurs, the alert control unit 119 checks whether or not the second predetermined time has elapsed since the process of step S101 was first executed (step S116). The second predetermined time is an arbitrary time longer than the analysis cycle and longer than the first predetermined time, but for example, it is set to three to four times the analysis cycle. When the second predetermined time has not elapsed, the process is returned to step S112.

When the second predetermined time has elapsed, the alert control unit 119 executes a process for permanently turning off the power supply of the vehicle 100 (step S117). The process for permanently turning off the power supply of the vehicle 100 is the same as the process described above.

In step S118, the alert control unit 119 considers that the cyber-attack has ended and executes a process to cancel the alert display. Specifically, the alert control unit 119 requests the communication control unit 115 to cancel the alert display. The communication control unit 115, in response to a request, for example, transmits data for instructing the cancellation of the alert display to the IVI system 140 through the FW unit 122a. When receiving the data, the IVI system 140 erases the alert display on the display. If an alert sound is being emitted, the alert sound is stopped. After that, the process is returned to step S101. The alert control unit 119 may report to the cloud center 200, through the communication control unit 115 and the TCU 130, that the cyber-attack has ended.

Example Embodiment 2

In the first example embodiment, the on-vehicle security measure device that implements the on-vehicle security measure method is incorporated into the CGW 110. In the second example embodiment, the on-vehicle security measure device is incorporated into the IVI system 140.

Figure 5:
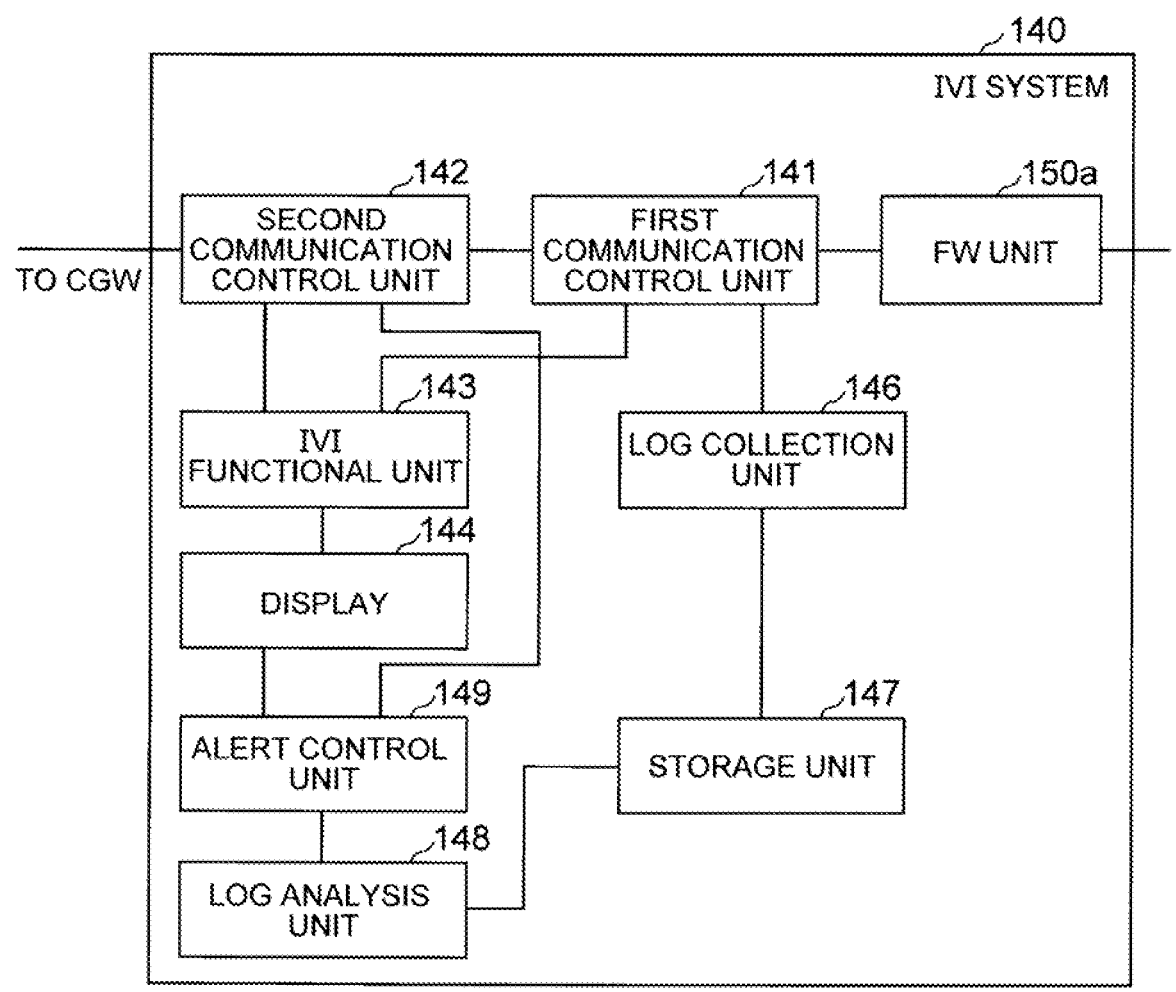
FIG. 5 It depicts a block diagram showing an example of a functional configuration of an IVI system.

FIG. 5 is a block diagram showing an example of a functional configuration of the IVI system 140. The IVI system 140 shown in FIG. 5 includes an FW unit 150a, a first communication control unit 141, a second communication control unit 142, an IVI functional unit 143, a display 144, a log collection unit 146, a storage unit 147, a log analysis unit 148, and an alert (warning) control unit 149.

The first communication control unit 141 controls data transfer so that data received from external devices is transferred to the IVI functional unit 143 and data from the IVI functional unit 143 is transferred to external devices. The second communication control unit 142 controls data transfer so that data received from the CGW 110 is transferred to the IVI functional unit 143 and data from the alert control unit 149 is transferred to the CGW 110.

The FW unit 150a has the same function as the FW 150 shown in FIG. 1. FIG. 5 shows a configuration in which the IVI system 140 incorporates the function of the FW 150. It is not necessary for the IVI system 140 to incorporate the function of the FW 150. The independent FW 150 may be installed outside the IVI system 140, as shown in FIG. 1.

The IVI functional unit 143 is a block that performs the function of the main unit of the IVI. When the IVI is a car navigation system, the function of the main unit of the IVI is car navigation. The display 144 performs displaying based on the display data output from the IVI functional unit 143. The display 144 also performs displaying based on data from the alert control unit 149.

The log collection unit 146 collects the data received by the first communication control unit 141 and stores the data as log data in the storage unit 147. The log analysis unit 148 analyzes the log data stored in the storage unit 147.

The alert control unit 149 executes the process for alert display when the log analysis unit 148 determines that the system may be under a cyber-attack (especially the "reconnaissance" stage of attack).

In this example embodiment, the on-vehicle security measure device that implements the on-vehicle security measure method is incorporated into the IVI system 140. The on-vehicle security measure device, for example, is realized by the first communication control unit 141, the log collection unit 146, the storage unit 147, the log analysis unit 148, and the alert control unit 149.

Next, the operation of the IVI system 140 will be described with reference to the flowchart of FIG. 6. In the process shown in FIG. 6, the data to be received from an external device (e.g., the smartphone 400 illustrated in FIG. 1) is the object.

Figure 6:
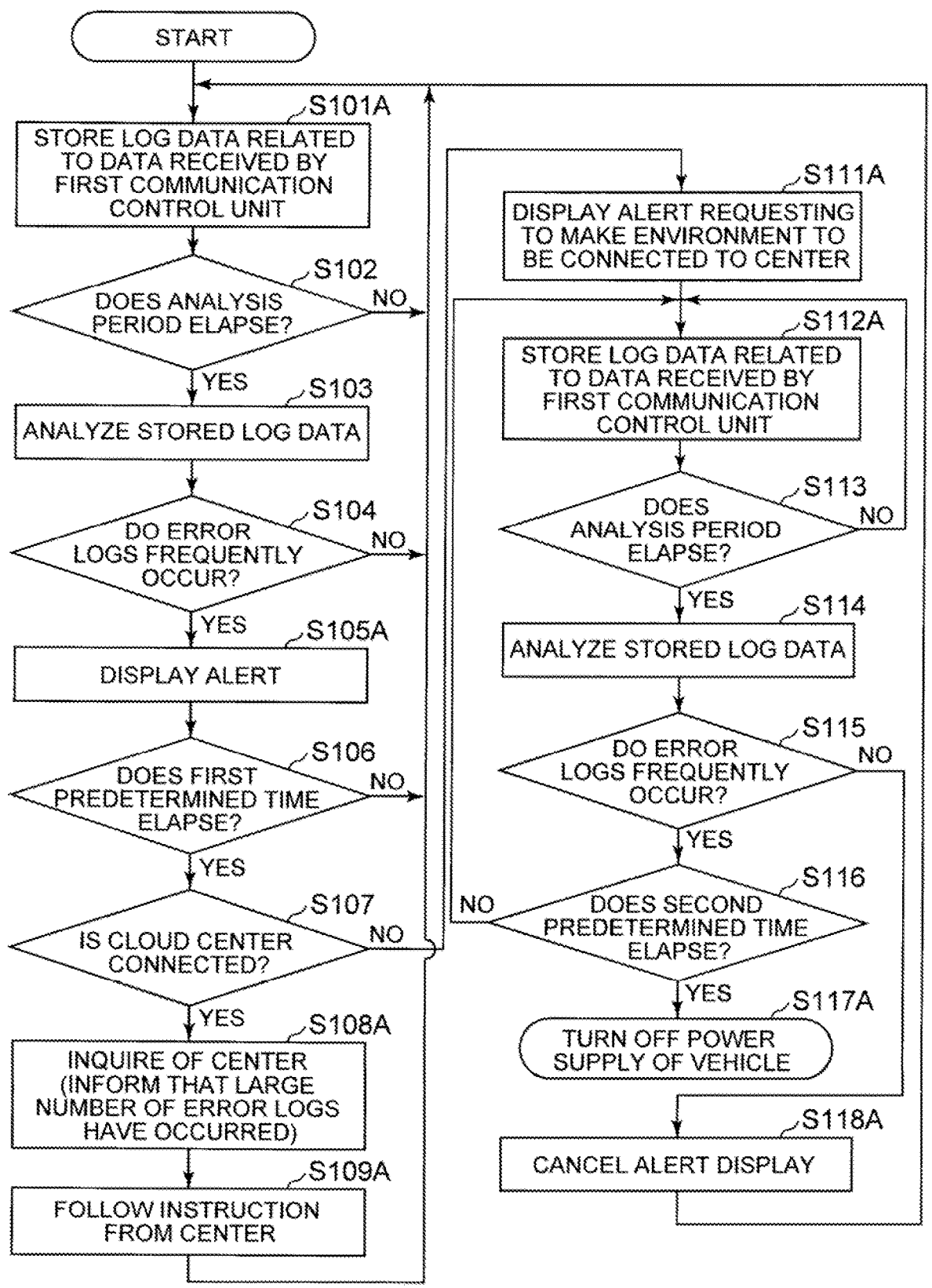
FIG. 6 It depicts a flowchart showing an operation of an IVI system.

The contents of the flowchart shown in FIG. 6, i.e., the operation of the IVI system 140, are almost identical to the contents of the flowchart shown in FIG. 4, i.e., the operation of the CGW 110.

However, in this example embodiment, the IVI system 140 sequentially stores the logs (communication logs) related to the data received by the first communication control unit 141 in the storage unit 147 (Steps S101A and S112A).

In addition, in step S105A, the alert control unit 149 directly gives data for alert display (first alert display) to the display 144 to display the alert. In step S108A, the alert control unit 149 outputs data to the second communication control unit 142 indicating that error logs have frequently occurred. The second communication control unit 142 transmits the data to the CGW 110. The CGW 110 transmits the data to the cloud center 200 through the TCU 130. In step S109A, the alert control unit 149 obtains, through the CGW 110, data indicating that a predetermined process is to be executed in response to the data indicating that error logs have frequently occurred. The data is the data transmitted from the cloud center 200.

Further, in step S111A, the alert control unit 149 directly has the display 144 display an alert display.

In step S117A, the alert control unit 149 executes a process for permanently turning off the power supply of the vehicle 100 when the second predetermined time has elapsed. In this example embodiment, the alert control unit 149 requests the CGW 110 to permanently turn off the power supply through the second communication control unit 142. The communication control unit 115 in CGW 110 transmits the power-off instruction to the ECU that controls the power supply, through transceiver 111 or transceiver 112. The ECU sets the vehicle 100 to a state where no power is supplied to the vehicle.

In step S118A, the alert control unit 149 directly has the display 144 cancel the alert display.

The rest of the process is the same as the process shown in FIG. 4.

Example Embodiment 3

In each of the above example embodiments, the on-vehicle security measure device is incorporated into the CGW 110 or IVI system 140, but an on-vehicle security measure device that executes the on-vehicle security measure method described above (refer to FIGS. 4 and 6) may be incorporated into other blocks in the on-vehicle system.

For example, the on-vehicle security measure method described above may be executed by TCU 130. The on-vehicle security measure method described above may also be executed by the ECUs 161, 162, 163, 164.

EXAMPLE

Next, a specific example will be explained. The following is an example of a case where an on-vehicle security measure device is incorporated into a CGW 110.

Suppose a cyber attacker purchases a vehicle 100 and conducts a "reconnaissance" stage cyber-attack on it through TCU 130, for example, to search for security holes.

If the cyber attacker continues the cyber-attack beyond a predetermined period of time (analysis period in the first example embodiment) (refer to step S102 in FIG. 4), the first alert display appears (refer to step S105) because error logs should be frequent in that period of time. The first alert display is expected to make the cyber attacker stop the cyber-attack.

However, if the cyber attacker does not stop the cyber-attack despite the first alert display, the power supply of the vehicle 100 will be permanently turned off, for example, according to the instruction of the cloud center 200 (refer to step S109). Thus, the cyber attacker cannot continue the cyber-attack.

When the vehicle 100 is not connected to the cloud center 200, the second alert display appears (refer to step S111), which is more severe than the first alert display. The second alert display is expected to stop the cyber attacker from conducting a cyber-attack.

However, if the cyber attacker does not stop the cyber-attack despite the second alert display, when the cyber attack continues beyond a predetermined period of time (the second predetermined time in the first example embodiment) (refer to step S116), the power supply of the vehicle 100 is permanently turned off (refer to step S109). Thus, the cyber attacker cannot continue the cyber-attack.

As explained above, the on-vehicle security device gives an alert indicating that an execution of a cyber-attack is discovered, as triggered by the fact that the occurrence frequency of error logs (number of error logs or percentage of error logs in total logs) in a predetermined period of time exceeds a predetermined threshold. If the cyber attacker ignores the alert and continues the cyber-attack, for example, the power supply of the vehicle 100 is permanently turned off (refer to step S109 in FIG. 4) or another alert is given (refer to step S111). If the cyber attacker ignores the another alert, the power supply is permanently turned off to establish a situation where the cyber attacker cannot carry out the cyber-attack.

Therefore, it can be expected that the reconnaissance activity of a cyber attacker will be effectively prevented.

The power supply may be turned off immediately and permanently without alert. However, considering the possibility that the occurrence frequency of error logs may increase for some reason when no cyber-attack is being made, it is preferable that the power supply be turned off permanently after an alert is given.

In this example, it is assumed that a cyber-attack is carried out on a vehicle purchased by a cyber attacker for the purpose of discovering a security hole, etc. However, there are various possible environments in which a cyber-attack can be carried out. For example, a vehicle 100 in a garage that has not been used for a long period of time could be a target. It is also possible that a cyber attacker removes all or a part of an on-vehicle system from the vehicle 100 in the garage and targets the removed on-vehicle system.

In each of the above example embodiments, an alert, etc. start based on the occurrence frequency of error logs, but alert, etc. may also start using an indicator other than error logs. For example, as an indicator other than the error log, the receive frequency of packets other than packets containing a specific ID (as an example, the ID of the cloud server 200 or the ID of the smartphone 400 owned by the user) can be used.

In addition, if a cyber attacker removes a part of the on-vehicle system (e.g., CGW 110) and performs an act of "reconnaissance" on the removed part of the on-vehicle system, the on-vehicle security measure device can perform the on-vehicle security measure method using the data that should pass through CAN 170. For example, if a situation arises in which data of speed information that should pass through CAN 170 cannot be received for a predetermined period of time, the alert control unit 119 (refer to FIG. 2) may execute the processing of step S105, step S108, S109, step 111, and step S117 (alert processing and power-off processing) shown in FIG. 4.

In addition, the above example embodiments are examples of on-vehicle security measure method executed by the on-vehicle system in the connected car, but the above security measure method can be applied to devices based on IoT technologies other than the connected car.

Further, as mentioned above, ASI is a technology that can effectively detect a cyber-attack, and it is meaningful to co-operate ASI with the on-vehicle security measure method described above.

Figure 7:
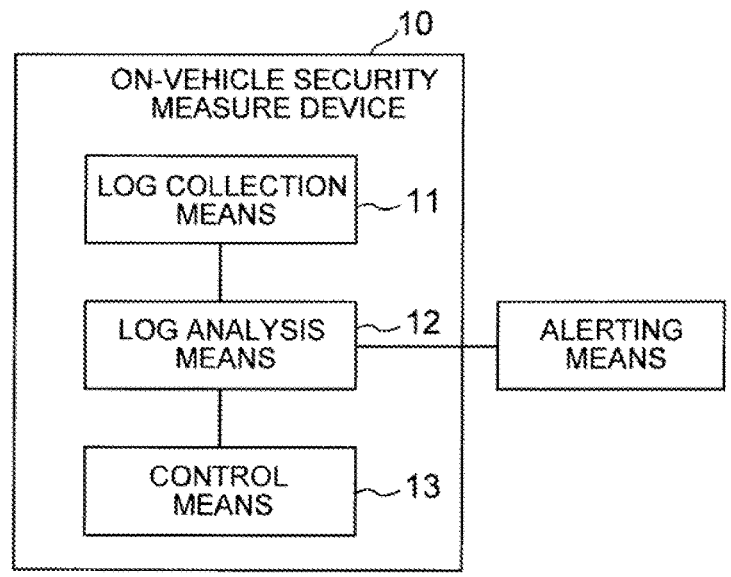
FIG. 7 It depicts a block diagram showing an overview of an on-vehicle security measure device.

FIG. 7 is a block diagram showing an overview of an on-vehicle security measure device. The on-vehicle security device 10 comprises log collection means 11 (in the example embodiments, realized by the log collection units 116 and 146) for collecting communication logs, log analysis means 12 (in the example embodiments, realized by the log analysis units 118 and 148) for analyzing the collected communication logs, and control means 13 (in the example embodiments, realized by the alert control unit 119 and the communication control unit 115, or the alert control unit 149 and the second communication control unit 142, etc.) for having alerting (warning) means (as an example, the display 144) issue an alert when it is determined that an error occurrence frequency exceeds a predetermined threshold value, based on an analysis result of the communication logs by the log analysis means 12, and blocks a communication path where an error has occurred when a state where the error occurrence frequency exceeds the predetermined threshold value continues after having the alerting means issue the alert.

Figure 8:
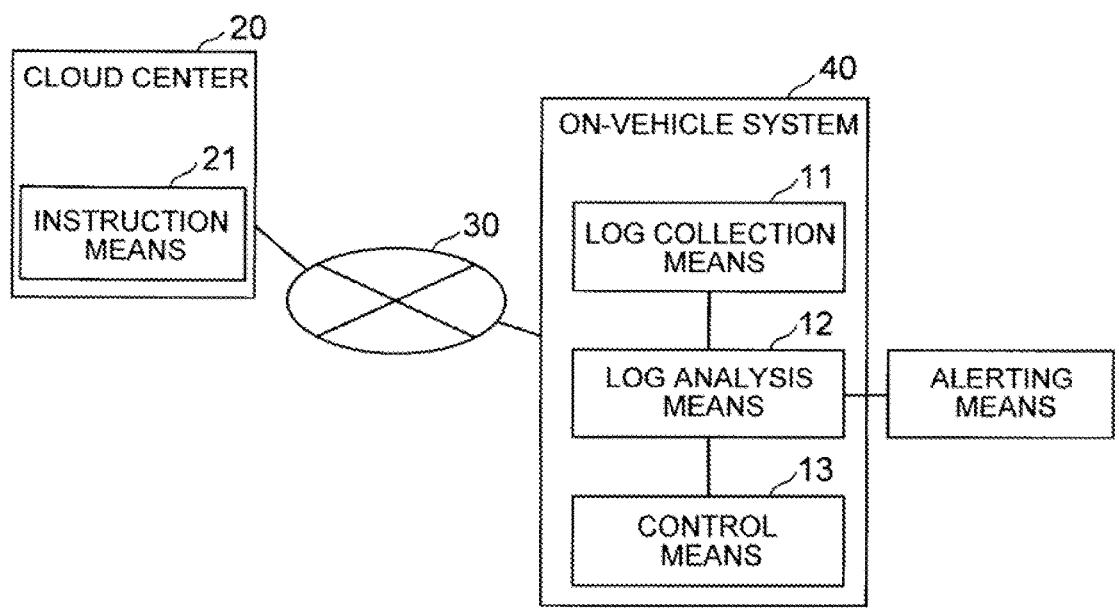
FIG. 8 It depicts a block diagram showing an overview of a security measure system.

FIG. 8 is a block diagram showing an overview of the security measure system. The on-vehicle security system comprises a cloud server 20 (in the example embodiments, realized by the cloud center 200) and an on-vehicle system 40 that can communicate with the cloud server 20 through a communication network 30, wherein the on-vehicle system 40 includes log collection means 11 for collecting communication logs, log analysis means 12 for analyzing the collected communication logs, and control means 13 for having alerting means issue an alert when it is determined that an error occurrence frequency exceeds a predetermined threshold value, based on an analysis result of the communication logs by the log analysis means 12, and transmits data indicating that the error occurrence frequency has exceeded the predetermined threshold to the cloud server 20 through the communication network 30 when a state where the error occurrence frequency exceeds the predetermined threshold value continues after having the alerting means issue the alert, and wherein the cloud server 20 includes instruction means 21 for transmitting data indicating to block a communication path where an error has occurred to the on-vehicle system 40 when the data indicating that the error occurrence frequency has exceeded the predetermined threshold is received.

Figure 9:
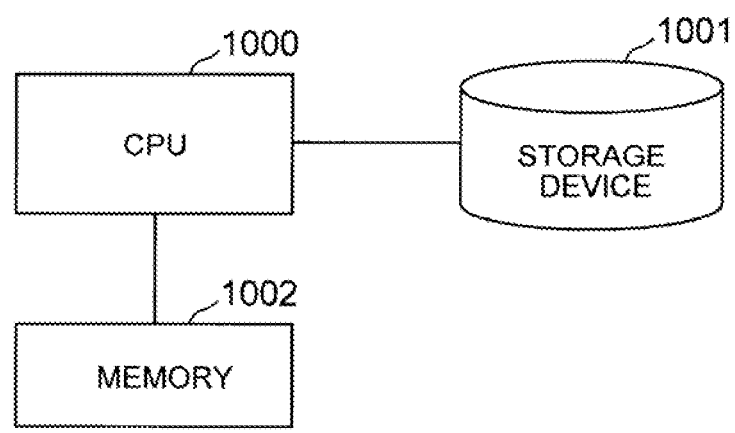
FIG. 9 It depicts a block diagram showing an example of a computer with a CPU.
Figure 10:
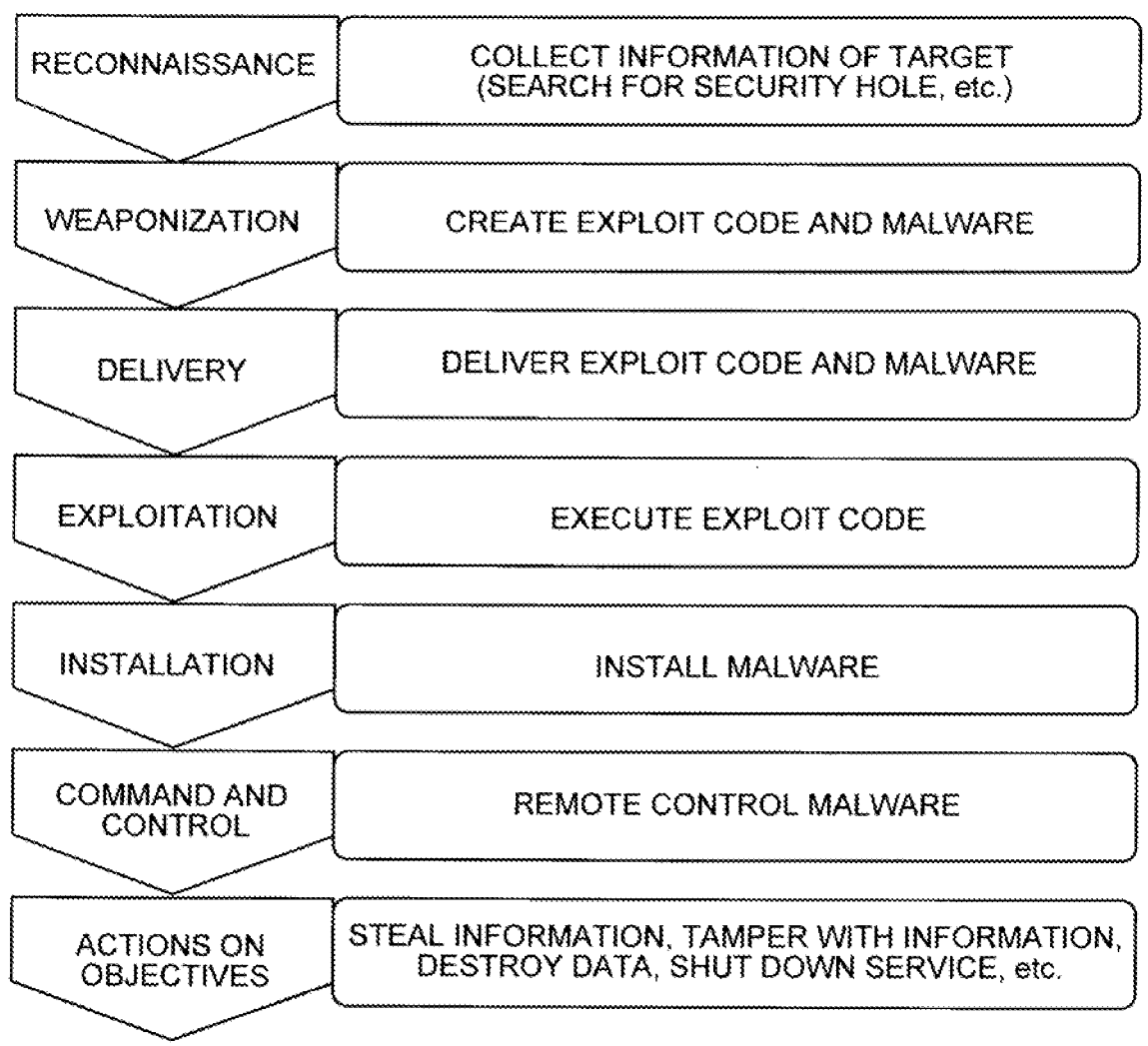
FIG. 10 It depicts an explanatory diagram showing a cyber-kill chain.

FIG. 9 is a block diagram showing an example of a computer having a CPU (Central Processing Unit). The computer is implemented in an on-vehicle security measure device (specifically, CGW 110, IVI system 140, etc.). The CPU 1000 executes processing in accordance with a security measure program stored in the storage device 1001 to realize the functions in the above example embodiments.

That is, when the computer is implemented in the CGW 110 shown in FIG. 2, the CPU 1000 realizes the functions of the communication control unit 115, the log collection unit 116, the log analysis unit 118, and the alert control unit 119 in the CGW 110. When the computer is implemented in the IVI system 140 shown in FIG. 5, the CPU 1000 realizes each function in the IVI system 140. That is, the CPU 1000 realizes the functions of the first communication control unit 141, the second communication control unit 142, the log collection unit 146, the log analysis unit 148, and the alert control unit 149. When the computer is implemented in the on-vehicle security measure device 10 shown in FIG. 7, the CPU 1000 realizes the functions of the log collection means 11, the log analysis means 12, and the control means 13.

The storage device 1001 is, for example, a non-transitory computer readable medium. The non-transitory computer readable medium includes various types of tangible storage media. Specific examples of the non-transitory computer readable medium includes a semiconductor memory (for example, a mask ROM, a PROM (programmable ROM), an EPROM (erasable PROM), a flash ROM).

The memory 1002 is realized, for example, by RAM (Random Access Memory), and is storage means for temporarily storing data when the CPU 1000 executes processing. The storage unit 117 shown in FIG. 2 and the storage unit 147 shown in FIG. 5 are realized by the memory 1002.

While the present invention has been described with reference to the example embodiments, the present invention is not limited to the aforementioned example embodiments. Various changes understandable to those skilled in the art within the scope of the present invention can be made to the structures and details of the present invention.

This application claims priority based on Japanese Patent Application No. 2019-047283 filed on Mar. 14, 2019, the disclosures of which are incorporated herein in their entirety.

REFERENCE SIGNS LIST

10 On-vehicle security measure device
11 Log collection means
12 Log analysis means
13 Control means
20 Cloud server
21 Instruction means
30 Communication network
40 On-vehicle system
100 Vehicle
111, 112 Transceiver
115 Communication control unit
116 Log collection unit
117 Storage unit
118 Log analysis unit
119 Alert control unit
121, 122 FW (firewall)
121a, 122a FW unit
130 TCU (Telematics Control Unit)
140 IVI System (In-vehicle Infotainment System)
141 First communication control unit
142 Second communication control unit
143 IVI functional unit
144 Display
146 Log collection unit
147 Storage unit
148 Log analysis unit
149 Alert control unit
150 FW (Firewall)
150a FW unit
161-164 ECU (Electronic Control Unit)
170 CAN
170a, 170b Bus
200 Cloud center
210 Communication interface unit
220 Vehicle control unit
230 Information management unit
240 Storage unit
1000 CPU
1001 Storage device
1002 Memory

What is claimed is:

1. An on-vehicle security measurement device comprising:
at least one memory storing instructions; and
at least one processor configured to execute the instructions to:
collect communication logs;
analyze the communication logs that have been collected;
determine whether or not an error occurrence frequency exceeds a predetermined threshold value, based on an analysis result of the communication logs that have been collected;
cause an alert to be issued when having determined that the error occurrence frequency exceeds the predetermined threshold value;
block a communication path where an error has occurred when a state where the error occurrence frequency exceeds the predetermined threshold value continues after the alert has been caused to be issued; and
preventing an engine of a vehicle from being started when the state where the error occurrence frequency exceeds the predetermined threshold value continues after the alert has been caused to be issued.

2. The on-vehicle security measurement device according to claim 1, wherein
the at least one processor is further configured to execute the instructions to permit the engine to again be started, after the engine has been prevented from being started, when a restart command is provided by an authorized person.

3. The on-vehicle security measurement device according to claim 1, wherein
the at least one processor is further configured to execute the instructions to compare an occurrence frequency of error logs within a predetermined period with a threshold value when analyzing the communication logs.

4. The on-vehicle security measurement device according to claim 1, wherein the on-vehicle security measurement device is installed in an on-vehicle relay device that is connectable to an on-vehicle network and a network used for communication with devices external to the vehicle.

5. The on-vehicle security measurement device according to claim 4, wherein the on-vehicle security measurement device is installed in a central gateway, the central gateway being the on-vehicle relay device.

6. An on-vehicle security measurement method performed by at least an on-vehicle security measurement device and comprising:
collecting communication logs;
analyzing the communication logs that have been collected;
determining whether or not an error occurrence frequency exceeds a predetermined threshold value, based on an analysis result of the communication logs that have been collected;
cause an alert to be issued when having determined that the error occurrence frequency exceeds the predetermined threshold value;
blocking a communication path where an error has occurred when a state where the error occurrence frequency exceeds the predetermined threshold value continues after the alert has been caused to be issued; and
preventing an engine of a vehicle from being started when the state where the error occurrence frequency exceeds the predetermined threshold value continues after the alert has been caused to be issued.

7. The on-vehicle security measurement method according to claim 6, further comprising permitting the engine to again be started, after the engine has been prevented from being started, when a restart command is provided by an authorized person.

8. The on-vehicle security measurement method according to claim 6, wherein
an occurrence frequency of error logs within a predetermined period is compared with a threshold value when analyzing the communication logs.

9. An on-vehicle security measurement system comprising a cloud server and an on-vehicle system that is configured to communicate with the cloud server through a communication network,
wherein the on-vehicle system includes:
at least one first memory storing first instructions; and
at least one first processor configured to execute the first instructions to:
collect communication logs;
analyze the communication logs that have been collected;
determine whether or not an error occurrence frequency exceeds a predetermined threshold value, based on an analysis result of the communication logs that have been collected;
cause an alert to be issued when having determined that the error occurrence frequency exceeds the predetermined threshold value; and
transmit an indication that the error occurrence frequency has exceeded the predetermined threshold to the cloud server through the communication network when a state where the error occurrence frequency exceeds the predetermined threshold value continues after the alert has been caused to be issued, and
wherein the cloud server includes:
at least one second memory storing second instructions; and
one or more second processors configured to execute the second instructions to:
transmit an instruction to the on-vehicle system to block a communication path where an error has occurred when the indication has been received; and
transmit an instruction to the on-vehicle system to prevent an engine of a vehicle from being started when the indication has been received.

10. The on-vehicle security measurement system according to claim 9, wherein
the at least one first processor is further configured to execute the first instructions to permit the engine to again be started, after the engine has been prevented from being started, when a restart command is provided by an authorized person.

\* \* \* \* \*